United States Patent [19]

Ehrlinger

[11] Patent Number: 4,884,669
[45] Date of Patent: Dec. 5, 1989

[54] MOTOR-VEHICLE ANTIRUNAWAY SYSTEM

[75] Inventor: Friedrich Ehrlinger, Friedrichshafen, Fed. Rep. of Germany

[73] Assignee: Zahnradfabrik Friedrichshafen AG, Friedrichshafen, Fed. Rep. of Germany

[21] Appl. No.: 232,605

[22] Filed: Aug. 15, 1988

[30] Foreign Application Priority Data

Aug. 14, 1987 [DE] Fed. Rep. of Germany ....... 3727088

[51] Int. Cl.⁴ ............................................. B60K 31/00
[52] U.S. Cl. ................... 192/4 B; 142/4 A; 142/0.09; 180/170; 303/100
[58] Field of Search ............ 192/48, 4 A, 30 W, 0.04, 192/0.049, 0.09; 303/100; 340/52 F; 180/171, 170; 364/426.04

[56] References Cited

U.S. PATENT DOCUMENTS

| | | | |
|---|---|---|---|
| 3,931,870 | 1/1976 | Hemmer | 192/413 |
| 4,117,903 | 10/1978 | Fleischer et al. | 364/426.04 |
| 4,124,088 | 11/1978 | Kuriyama et al. | 180/170 |
| 4,262,783 | 4/1981 | Scarrott et al. | 192/0.09 |
| 4,278,969 | 7/1981 | Woods | 340/52 F |
| 4,433,746 | 2/1984 | Steel | 180/171 |
| 4,462,479 | 7/1984 | Steel | 180/171 |
| 4,485,444 | 11/1984 | Maruyama et al. | 364/426.04 |
| 4,630,507 | 12/1986 | Kugler et al. | 192/0.09 |
| 4,696,380 | 9/1987 | Kita | 192/4 A |
| 4,778,223 | 10/1988 | Inoue | 303/100 |

Primary Examiner—Leslie A. Braun
Assistant Examiner—Andrea Pitts
Attorney, Agent, or Firm—Herbert Dubno

[57] ABSTRACT

An antirunaway system is used in a motor vehicle having an engine, a transmission displaceable between a neutral position and a plurality of different speed positions, an engageable and disengageable clutch connected between the transmission and the engine, and a brake for slowing the vehicle. The system comprises a clutch sensor for generating an output when the clutch is engaged, a transmission sensor for generating an output when the transmission is in the neutral position, a speed sensor for determining the vehicle ground speed, and a controller connected to all of the sensors and to the brake for actuating the brake and slowing the vehicle when both the outputs are being generated and when the ground speed determined by the speed sensor exceeds a predetermined limit. The controller can also or instead be connected to an alarm for issuing a warning to the driver of the runaway condition.

5 Claims, 1 Drawing Sheet

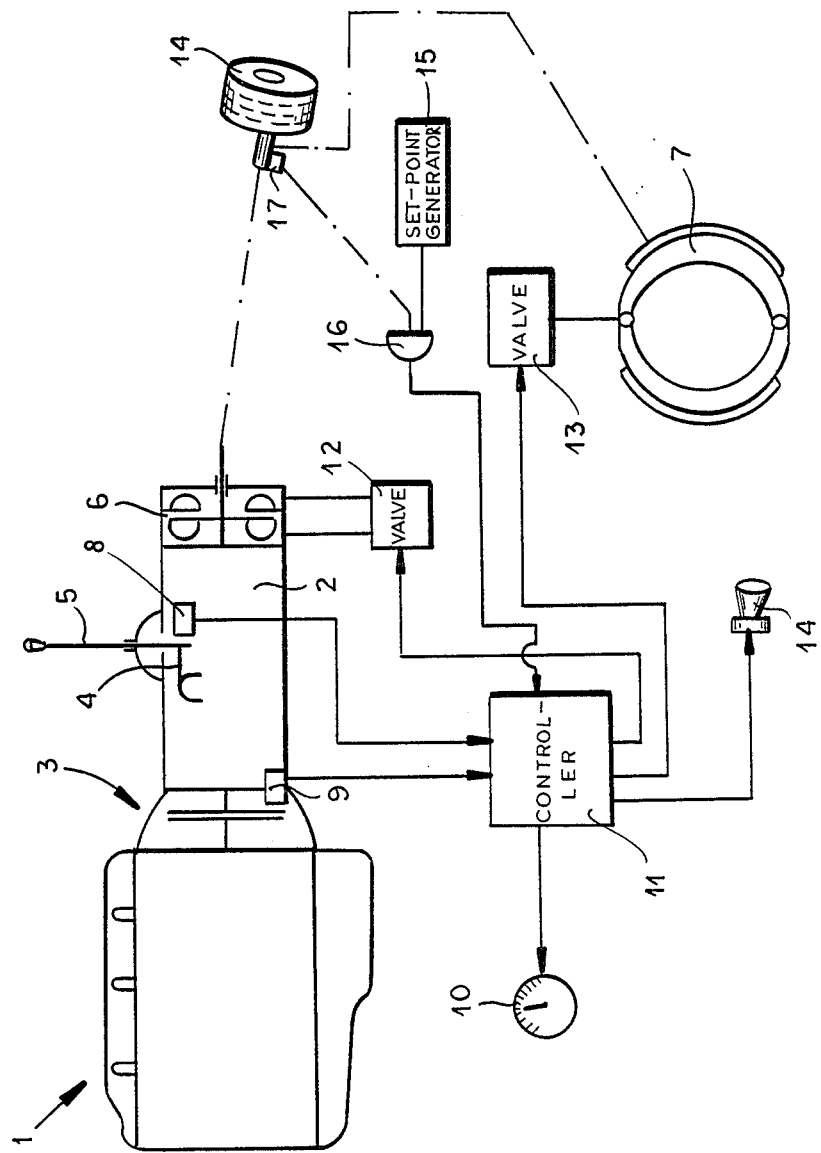

MOTOR-VEHICLE ANTIRUNAWAY SYSTEM

FIELD OF THE INVENTION

The present invention relates to a system for preventing runaway of an automotive vehicle. More particularly this invention concerns a system which automatically takes action if a vehicle coasts at too high a speed.

BACKGROUND OF THE INVENTION

It is known to provide a motor vehicle with an indicator which shows the gear or drive speed that the vehicle transmission, whether automatic or manual, is set for. This indicator simply furnishes the driver with a display of this information that is typically only referred to when the speed gear or drive speed is to be obtained. In a manual transmission, where the system is rarer, it indicates the gear-speed number, normally 1 through 4 or 5 and R for reverse, and in an automatic transmission the readout indicates D for standard forward drive, R for reverse, and $D_1$ and $D_2$ or L for low forward drive speed. Such an arrangement is described in German Pat. No. 2,646,393.

It is not unknown for a vehicle to slip out of gear while, for instance, riding down a hill. The result is a substantial gain in speed which the driver will not normally notice immediately since he or she is doing nothing to accelerate and is presuming standard engine braking will maintain speed constant. This can happen when a clutch or transmission component fails or when the gear shift is accidentally knocked into the neutral position. The result is an extremely dangerous circumstance since not only can the vehicle assume a speed it is difficult to slow it down from, but the benefits of engine braking are lost and the wheel brakes alone must be relied on.

OBJECTS OF THE INVENTION

It is therefore an object of the present invention to provide an improved antirunaway system for a motor vehicle.

Another object is the provision of such an improved antirunaway system for a motor vehicle which overcomes the above-given disadvantages, that is which takes some action when the vehicle runs away to protect the vehicle occupants.

SUMMARY OF THE INVENTION

The instant invention is an antirunaway system used in a motor vehicle having an engine, a transmission displaceable between a neutral position and a plurality of different speed positions, an engageable and disengageable clutch connected between the transmission and the engine, and a brake for slowing the vehicle. The system comprises a clutch sensor for generating an output when the clutch is engaged, a transmission sensor for generating an output when the transmission is in one of the speed positions, a speed sensor for determining the vehicle ground speed, and a controller connected to all of the sensors and to the brake for actuating the brake and slowing the vehicle when both the outputs are being generated and when the ground speed determined by the speed sensor exceeds a predetermined limit. The controller can also or instead be connected to an alarm for issuing a warning to the driver of the runaway condition.

Thus the system of this invention automatically takes action when the vehicle runs away. It brakes the vehicle and/or issues an alarm, protecting the occupant(s) of the vehicle from this potentially very dangerous situation.

According to another feature of this invention the brake is an antilocking brake. In addition, a hydrodynamic retarder can be connected to the engine and actuated by the controller when it actuates the brake.

DESCRIPTION OF THE DRAWING

The above and other objects, features, and advantages will become more readily apparent from the following, reference being made to the accompanying drawing whose sole FIGURE is a largely schematic representation of the system of this invention.

SPECIFIC DESCRIPTION

As seen in the drawing, the motor vehicle according to this invention has an engine 1 shows output is connected via a clutch 3 to a transmission 2 connected in turn to a torque converter or retarder 6 and to the motor vehicle wheels 14, only one of which is shown. The transmission 2 is of the manual type, although an automatic transmission is equally within the scope of this invention, having gear-change mechanism 4 controlled by a gear-shift lever 5. The wheels 14 are retarded by brakes 7 having control valves 13 and equally the hydrodynamic retarder 6 can be operated by a valve 12 to slow the wheels 14.

According to this invention the clutch 3 is provided with a detector or sensor 9 that generates an output which could be an electrical signal increase or decrease, a resistance, or other usable change, when the clutch 3 is engaged, that is when it is coupling the engine 1 to the transmission 2. The transmission 2 is similarly provided with a detector or sensor 8 that generates an output when this transmission 2 is in the neutral position, that is when it is not transmitting torque from its input to its output. The wheel 14 or transmission 2 is provided with a speed detector 17 that detects ground speed $V_{actual}$ which is displayed by a speedometer 10.

All these sensors 8, 9, and 17 are connected to an electronic controller 11 which is also connected to the valves 12 and 13 and to a warning device 14. In addition a set-point generator 15 is connected to one input or a comparator 16 whose other input is connected to the ground-speed detector 17 and whose output generates a signal when the detected ground speed exceeds a predetermined minimum speed $V_{min}$.

This controller 11 actuates the alarm 14 to warn the vehicle operator, and/or actuates the brake valve 13 to slow the vehicle, and/or operates the valve 12 to slow the vehicle via the retarder 6 when all three of the following conditions exist:

1. The sensor 9 indicates that the clutch is engaged.
2. The sensor indicates that the transmission is in neutral.
3. The ground speed $V_{actual}$ exceeds the threshold speed $V_{min}$.

Thus the occupant(s) of the vehicle are protected.

Of course with an automatic transmission it may be possible to do away with the sensor 9 and merely rely on transmission position.

We claim:
1. In a motor vehicle having:
   an engine;
   a transmission displaceable between a neutral position and a plurality of different speed positions;

an engageable and disengageable clutch connected between the transmission and the engine; and a brake for slowing the vehicle, an antirunaway system comprising:

clutch sensor means for generating an output when the clutch is engaged;

transmission sensor means for generating an output when the transmission is in the neutral position;

speed sensor means for determining the vehicle ground speed; and control means connected to all of the sensor means and to the brake for actuating the brake and slowing the vehicle when both the outputs are being generated and when the ground speed determined by the speed sensor means exceeds a predetermined limit.

2. The motor-vehicle antirunaway system defined in claim 1, further comprising an alarm, the control means being connected to the alarm for actuating same when said control means actuates the brake.

3. The motor-vehicle antirunaway system defined in claim 2 wherein the brake includes a means for preventing locking of said brake.

4. The motor-vehicle antirunaway system defined in claim 2, further comprising a hydrodynamic retarder connected to the engine and actuated by the control means when said control means actuates the brake.

5. In a motor vehicle having:

an engine;

a transmission displaceable between a neutral position and a plurality of different speed positions;

an engageable and disengageable clutch connected between the transmission and the engine; and a brake for slowing the vehicle, an antirunaway system comprising:

clutch sensor means for generating an output when the clutch is engaged;

transmission sensor means for generating an output when the transmission is in the neutral position;

speed sensor means for determining the vehicle ground speed;

an alarm; and control means connected to all of the sensor means and to the alarm for actuating the alarm when both the outputs are being generated and when the ground speed determined by the speed sensor means exceeds a predetermined limit.

* * * * *